United States Patent [19]

Hogan

[11] Patent Number: 4,526,076
[45] Date of Patent: Jul. 2, 1985

[54] MULTIPLE STROKE SHEAR

[76] Inventor: Robert V. Hogan, 4125 Moraga, San Diego, Calif. 92117

[21] Appl. No.: 517,071

[22] Filed: Jul. 25, 1983

[51] Int. Cl.³ .................. B23D 17/08; B23D 29/02
[52] U.S. Cl. .................................. 83/554; 83/574; 83/600; 83/602; 30/187
[58] Field of Search .................. 83/574, 600–606, 83/554; 30/186–193, 251

[56] References Cited

U.S. PATENT DOCUMENTS

| | | | |
|---|---|---|---|
| 103,152 | 5/1870 | Daniels | 30/189 |
| 339,641 | 4/1886 | Griffin. | |
| 1,148,714 | 8/1915 | Pedersen. | |
| 1,458,878 | 6/1923 | Dexter. | |
| 1,559,082 | 10/1925 | Friederici. | |
| 1,559,083 | 10/1925 | Friederici. | |
| 1,717,043 | 6/1929 | Kistler | 30/251 X |
| 2,712,851 | 7/1955 | Carter et al. | |
| 3,899,950 | 8/1975 | Dvorak | 83/588 |
| 4,178,682 | 12/1979 | Sadauskas | 30/192 X |
| 4,300,425 | 11/1981 | Wozniak | 83/603 |

*Primary Examiner*—James M. Meister
*Attorney, Agent, or Firm*—Brown, Martin & Haller

[57] ABSTRACT

A multiple stroke shear for cutting bar stock and like workpieces incorporates a pair of hinged jaws with opposed cutting blades mounted thereon. A control assembly mounted in the jaws interconnects the jaws to control the position of the cutting blades relative to one another and applies the cutting force between the cutting blades when successively activated by an operating lever attached to the control assembly in the upper jaw. The control assembly includes provision for maintaining contact with a workpiece between successive cutting strokes. In one embodiment, a handle attached to the lower jaw is used with the operating lever to control and operate the shear manually at the worksite. In a second embodiment, a bracket replaces the handle to attach the shear to a fixed support.

3 Claims, 8 Drawing Figures

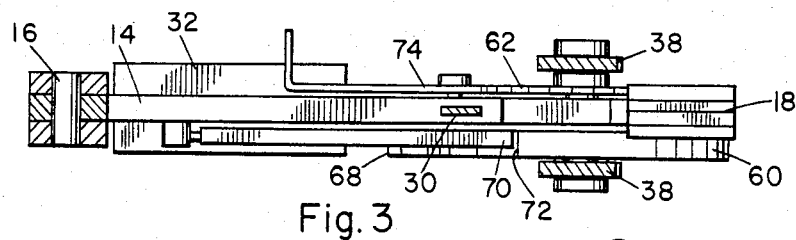
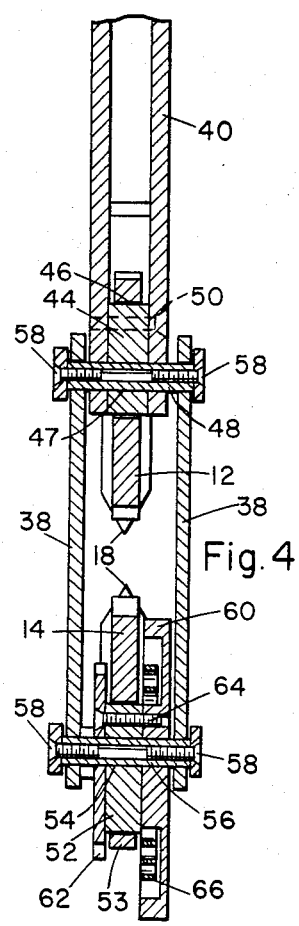
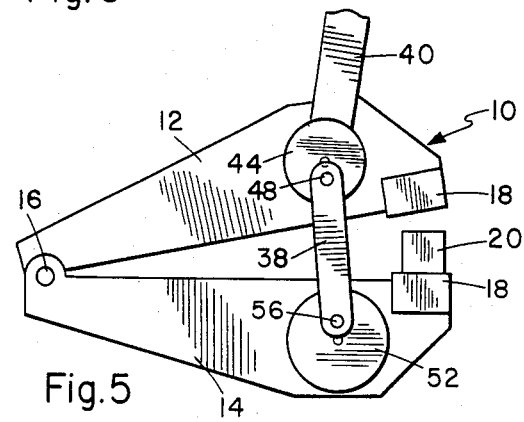
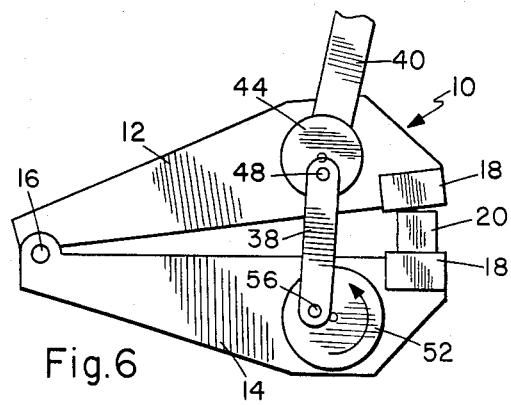
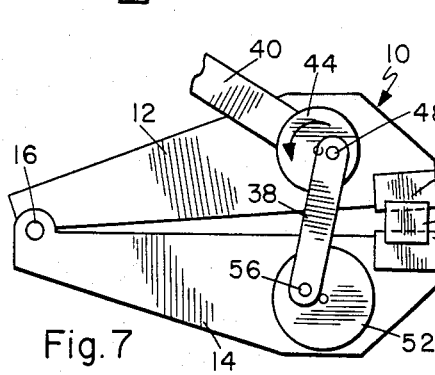
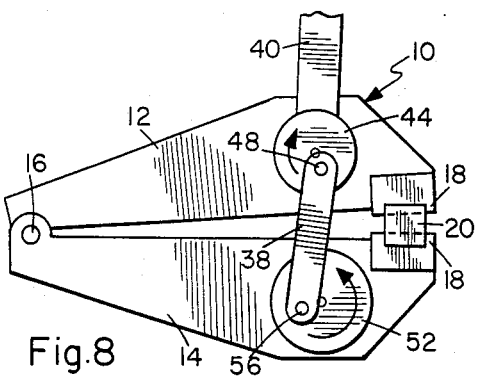

MULTIPLE STROKE SHEAR

BACKGROUND OF THE INVENTION

Generally available devices for cutting heavy metal stock such as reinforcing bar and like workpieces are stationary and heavy. Their use therefore, is limited, and they are not capable of hand operation or for being easily taken to a worksite. Pinch bars and bolt cutters are portable and are available to accomplish some cutting tasks, and are often used in applications such as the cutting of padlocks. However, the latter cutters are designed to accomplish the cut in one stroke, and of necessity have long handles in order to provide sufficient leverage to accomplish the task. This makes them awkward or impossible to use where space is limited. It is desirable, therefore, to have a cutting shear that is capable of cutting heavy stock manually, and which is also portable and of compact size so as to be able to be operated successfully in a confined work space. A shear employing a short operating lever to provide multiple incremental cuts on a workpiece will provide such a tool. Such a device should also maintain contact with the workpiece once the cutting operation has begun and substitute multiple subsequently deeper cuts on the workpiece for the force of power driven cutters or long leverage arms. Applicant's invention provides a shear meeting the above requirements.

SUMMARY OF THE INVENTION

According to the invention, a portable manually operated multiple stroke shear has been devised which permits the cutting of heavy bar stock and similar workpieces. A strong and rigid, but compact, pair of hinged jaws with opposed cutting blades mounted thereon form the principal strength members of the shear. According to a further precept of the invention, a control assembly, operated by a single short lever, interconnects the jaws and provides for the application of a cutting torque between the cutting blades. A component of the control assembly simultaneously provides for maintenance of contact of the cutting blades with the workpiece being cut until the workpiece is severed.

In the exemplary embodiment of the invention, the shear consists of upper and lower jaws hingedly connected together and having cutting blades mounted on the upper jaw and lower jaw that cooperate in cutting a workpiece. The operation of the jaws is controlled by a control assembly attached in circular apertures in the upper and lower jaws spaced between the jaw hinge and the cutting blades, equidistant from the cutting blades. The components of the control assembly serve to open and close the jaws about the hinge so as to separate and bring together the cutting blades mounted upon the jaws. A manually operated lever connected to the control assembly at the upper jaw causes the operation of the shear. Two embodiments of the shear are illustrated. In the first embodiment, a handle attached to the lower jaw is used in conjunction with the operating lever supporting and manipulating the shear at a worksite. In the second embodiment, a mounting plate is attached to the lower jaw for mounting the shear to a fixed structure such as a work table, and the work is brought to the shear.

The operation of the shear is the same in both embodiments. The control assembly has cylinders rotatable in the circular apertures located in the upper and lower jaws. Eccentric action is provided by eccentric pins which pass through the cylinders parallel to the long dimension of the cylinders and which rotate in the cylinders. The axes of the eccentric pins are offset from the centerline axes of the cylinders so that rotation of the cylinders results in linear movement of the eccentric pins toward and away from the plane of the cutting blades along a line generally perpendicular to the edge of the cutting blades. The ends of the eccentric pins of the upper jaw cylinder and the lower jaw cylinder are interconnected by a pair of links and are rotatable therein. The interconnecting links integrate the motion of the upper and lower jaw eccentric pins to control the spacing between the cutting blades and apply the cutting force between them. The upper jaw cylinder is of smaller diameter than the cylinder of the lower jaw and applies the torque for cutting. The larger diameter of the lower jaw cylinder provides for cutting blade positioning. An operating lever attached to the upper jaw cylinder rotates the cylinder to move the jaws together applying the cutting force against the workpiece.

The lower jaw cylinder has connected to it a workpiece contact subassembly which controls the position of the lower jaw cylinder in order to permit easy insertion of the workpiece by widening the space between the cutting blades. This subassembly also fixes the position of the lower jaw cylinder during a cut upon the workpiece. In addition, the workpiece contact subassembly provides for movement of the lower cylinder so as to maintain contact of the upper and lower cutting blades with the workpiece between incremental cuts thereon. In accordance with the invention, these latter capabilities are supplied by having a control disc attached to the lower cylinder on one side of the lower jaw, and a ratchet attached to the cylinder on the opposite side of the lower jaw. A spring wound about the lower cylinder connects the control disc to the lower jaw. Rotation of the control disc causes the spring to wind and store energy, and at the same time the eccentric pin of the lower cylinder is raised to a position nearest the plane of the cutting blades. A control disc pawl mounted pivotally on the lower jaw locks the rotated disc in a cocked position. In this condition, the action of the lower jaw cylinder forces the lower jaw to its farthest position from the upper jaw. A ratchet pawl pivotally mounted to the lower jaw engages the teeth of the ratchet to fix the position of the lower cylinder and control disc during a cutting stroke of the operating lever.

The primary object of the invention is to provide a new and improved shear for cutting workpieces of substantial strength by successive incremental cuts. The shear is capable of heavy duty, yet portable. By virtue of the unique cutting power arrangement the shear does not require power drives and may be operated manually. It is small in size and does not require extensive working room in order to cut the workpieces. The design provides for manual control and operation of the shear, or it may be mounted near the work site on a table or work bench. Long lever arms are not required to achieve the cutting action. These and other advantages of applicant's invention will be more fully understood upon reading the detailed description that follows in conjunction with the drawings in which like numerals refer to like part throughout and in which:

FIG. 3 is a sectional view taken on line 3—3 of FIG. 1;

FIG. 4 is a sectional view taken on line 4—4 of FIG. 1; and

FIGS. 5–8 illustrate diagrammatically the loading, clamping, cutting and reset position of the control mechanism of the shear.

DETAILED DESCRIPTION OF THE DRAWINGS

Figure 1:
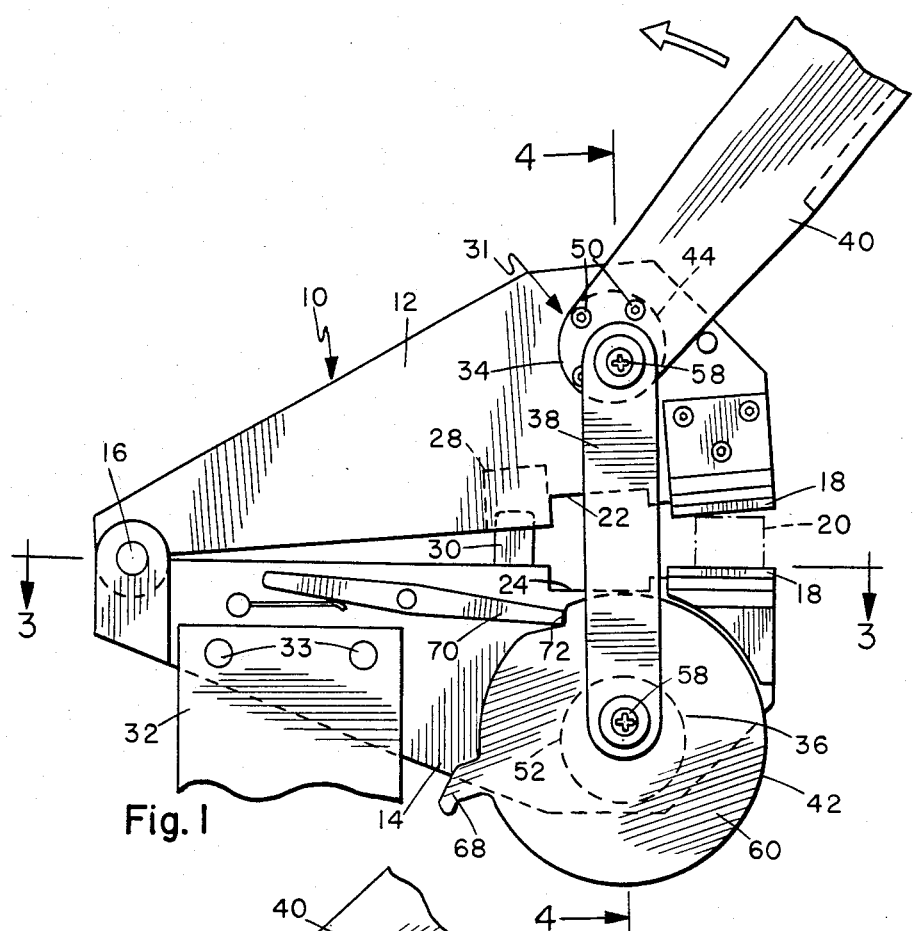
FIG. 1 is a side elevation of the shear in the open or loading position.
Figure 2:
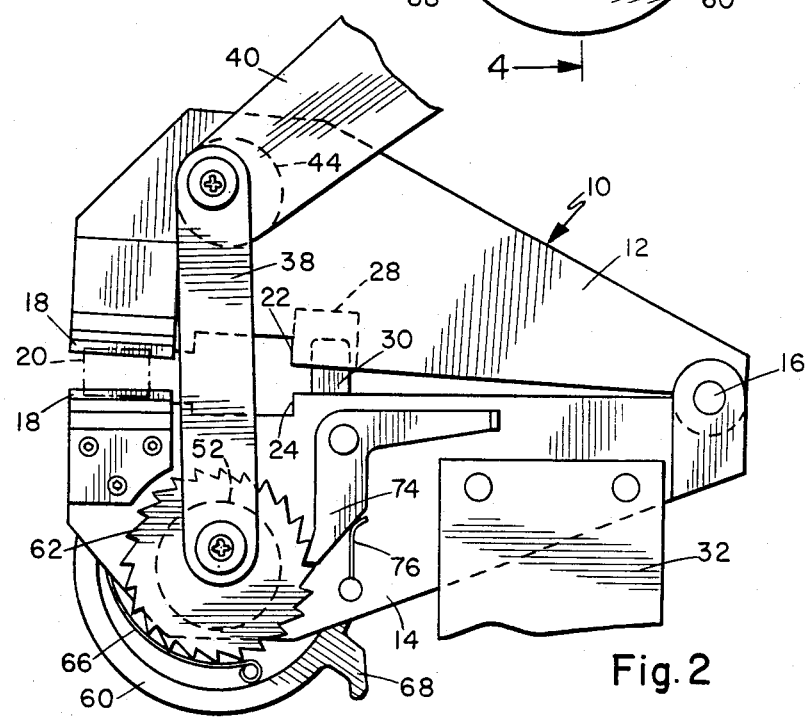
FIG. 2 is a side elevation view from the opposite side, with the shear in a cutting stroke position.

The multiple stroke shear 10 is illustrated in FIGS. 1 and 2. Shear 10 is designed to employ a repeatedly applied high cutting force through a short distance to cut through a workpiece retained between its cutting blades until the cutting operation is completed. Shear 10 can thus cut through a heavy workpiece while retaining a relatively small and compact configuration. FIG. 1 depicts the right side elevation of the shear 10 as viewed by an operator holding the shear, while FIG. 2 illustrates the left side elevation. Shear 10 includes an upper jaw 12 and a lower jaw 14 hingedly connected in opposed relationship about a hinge pin 16 located at one end of the jaws. In the embodiment illustrated, the jaws 12 and 14 are formed of steel plate to supply strength and rigidity for the shear 10. Replaceable cutting blades 18 mount adjacent the ends of the upper and lower jaws opposite the hinge pin 16. As illustrated in FIG. 1, a workpiece 20 is placed between the cutting blades 18 ready for cutting. In FIG. 2, the workpiece 20 is depicted partially cut.

Corresponding rectangular cut away sections 22 and 24 in the upper and lower jaws, respectively, are formed adjacent to the cutting blades 18 so that a wider workpiece may be incrementally cut by the shear 10 without interference with the cutting blades 18. A guide slot 28 is formed in the upper jaw 12 into which a guide stud 30 mounted on the lower jaw 14, fits with a sliding fit. The guide and stud arrangement insures alignment of the upper jaw 12 and the lower jaw 14 during cutting operation upon the workpiece 20.

The shear 10 is operated by a control assembly 31 mounted adjacent to, and inboard of the cutting blades 18, which operationally interconnects the upper jaw 12 and the lower jaw 14. The control assembly 31 will be subsequently described in detail. Operating lever 40 is attached to the control assembly 31. Rotation of the operating lever 40 provides torque for cutting the workpiece 20, and also serves to position the shear 10 when it is manually held at a worksite. Support member 32 secured to the lower jaw 14 by rivets 33 represents a handle for the positioning and control of the shear 10, in conjunction with operating lever 40, when the shear is hand held by an operator. In a second embodiment, support member 32 represents a bracket attachable to a work bench for mounting the shear 10 at a fixed location.

As illustrated in FIGS. 1 and 2, control assembly 31 consists of four principal subassemblies, namely a torque eccentric 34, a cutting blade position eccentric 36, integrating links 38, and a workpiece contact subassembly 42. The workpiece contact subassembly 42 cooperates with the cutting blade position eccentric 36 to maintain the cutting blades 18 firmly in contact with the workpiece 20 between incremental cutting strokes of the operating lever 40 until the workpiece is severed.

As illustrated in FIGS. 1 and 4, the torque eccentric 34 consists of a cylinder 44 which is rotatable in a circular aperture 46 formed in the upper jaw 12. The length of the cylinder 44 is equal to the width of the plate forming the upper jaw 12. The cylinder 44 has a longitudinal passage 47 therethrough offset radially 0.150 inch from the longitudinal axis of the cylinder 44. An eccentric pin 48 fits rotatably in the offset passage 47 of the cylinder 44. The forked operating lever 40 is attached at both ends of the cylinder 44 by through screws 50. The lever 40 is attached to the cylinder 44 such that the eccentric pin 48 is positioned closest to the plane of the cutting blades 18 when the operating lever 40 is in a raised position prior to the application of a cutting stroke.

The construction of the cutting blade position eccentric 36 is essentially the same as that of the torque eccentric 34. As illustrated in FIGS. 1, 2 and 4, a cylinder 52 is mountable within a lower jaw aperture 53. Cylinder 52 has an offset passage 54 through which passes an eccentric pin 56. Pin 56 rotates in the passage 54. The cylinder 52 is of larger diameter than the cylinder 44 of the torque eccentric 34, and the offset distance of pin 56 0.437 inch, is also larger to provide for greater linear movement of the pin 56.

Pin 48 of the torque eccentric 34 and pin 56 of the cutting blade position eccentric 36 are connected together by, and rotate in, the integrating links 38 which are attached to the ends of the pins by cap screws 58. The links 38 coordinate and integrate the operation of the other subassemblies of control assembly 31.

A control disc 60 and other components of the workpiece contact subassembly 42 are attached to the cylinder 52. Control disc 60 is secured to the cylinder 52 on the right side of the shear 10, and ratchet 62 is attached to the cylinder 52 on the left side of the shear 10 by screws 64 (FIG. 4). A helically wound spring 66 is connected between control disc 60 and lower jaw 14 such that tension is established in the spring 66 when the control disc 60 is rotated by finger 68 in a clockwise direction as viewed in FIG. 1. The position of the eccentric pin 56 in the cylinder 52 is such that it is positioned closest to the plane of the cutting blades 18 when the control disc is fully rotated in a clockwise direction. When fully wound, the control disc 60 is maintained in that position against the urging of spring 66 by the pawl 70 which fits into the notch 72 of the control disc until released by the operator.

As illustrated in FIG. 2, ratchet 62 is engaged by ratchet pawl 74 by the urging of the ratchet spring 76. The ratchet and pawl arrangement is such as to permit clockwise rotation of the control disc 60, as viewed in FIG. 2, but to prevent rotation of the ratchet and cylinder 52 in a counterclockwise direction unless pawl 74 is first disengaged from the ratchet 62 by the operator.

OPERATION

Because of the interaction between the torque eccentric 34 and the cutting blade position eccentric 36 resulting form their interconnection by the links 38, rotary motion of the cylinders 44 and 52 is translated into integrated relative motion between the cutting blades 18 during operation of the shear 10. The position and operation of the control assembly components during operation of the shear 10 will now be further described with reference to the schematic diagrams of FIGS. 5–8. In the description that follows clockwise and counterclockwise rotations will be with reference to viewing the right side of the shear 10.

The shear 10 is illustrated in FIG. 5 positioned for receiving a workpiece 20 between the cutting surfaces 18. The raised position of the operating lever 40 rotates the torque eccentric cylinder 44 so as to position the eccentric pin 48 nearest the plane of the cutting blades. The rotation of the eccentric pin 48 forces the links 38 downward, thus separating the cutting blades 18. As illustrated in FIG. 5, the control disc 60 has been fully rotated winding spring 66 and positioning eccentric pin 56 nearest the plane of the cutting blades 18. This position of the pin 56 forces the links 38 upward, further separating the cutting blades 18 to their maximum opening. A workpiece 20 of maximum thickness for the shear 10 may then be accommodated between the cutting blades 18.

In FIG. 6, the shear 10 is illustrated initially clamping a workpiece 20 between the cutting blades 18 preparatory to the first cutting stroke by the operating lever 40. Control disc 60 has been released by the operator by disengaging the pawl 70 from the disc notch 72. The stored energy of spring 66 has rotated the cutting blade position cylinder counterclockwise rotating the eccentric pin 56 downwardly. Since the position of the eccentric pin 48 has not changed, the downward force on the links 38 causes the lower jaw 14 to move toward the upper jaw 12 until the cutting blades 18 engage the workpiece 20. When this occurs, the ratchet pawl 74 engages the ratchet 62 preventing clockwise rotation of the ratchet 62 and eccentric cylinder 52.

A cutting stroke of the shear 10 is schematically illustrated in FIG. 7. The cutting stroke is effected by counterclockwise rotation of the operating lever 40 which rotates eccentric cylinder 44 in the same direction. Such rotation causes the eccentric pin 48 to move away from the plane of the cutting blades 18 and exert an upward force on the links 38. The engagement of ratchet pawl 74 with the ratchet 62 prevents clockwise rotation of cylinder 52, thus the torque applied by operating lever 40 results in a force bringing the cutting blades 18 together.

In FIG. 8, the shear 10 is illustrated in its reset position preparatory to another cutting stroke by operating lever 40. To achieve this, operating lever 40 is again moved upward. Rotation of cylinder 44 positions eccentric pin 48 again nearest the plane of the cutting blades 18. The lower position of the pin 48 relieves the tension on links 38 that has been tending to rotate cylinder 52 clockwise. The tension relief simultaneously permits the spring 66 to again rotate cylinder 52 in a counterclockwise direction moving eccentric pin 56 away from the plane of the cutting blades 18. Since the diameter of cylinder 52 is larger than that of cylinder 44, the counterclockwise rotation of cylinder 52 takes up the slack and causes the cutting blades to maintain their grip on the workpiece 20. A cutting stroke is then repeated and the sequence continued until the cut is completed.

Having described my invention, I claim:

1. A multiple stroke shear for use in cutting a workpiece comprising:
    an upper and a lower jaw hingedly connected together, and having apertures therein, for transmitting a cutting force;
    cutting blades mountable on said upper and lower jaws in opposed operational relationship for cutting a workpiece between said blades;
    said upper and lower jaw apertures being spaced between said jaw hinge and said cutting blades, and adjacent to said cutting blades;
    a first eccentric means mountable in said upper jaw aperture for positioning said upper jaw cutting blade in spaced relationship to said lower jaw cutting blade;
    lever means connectable to said first eccentric means for operating said first eccentric means for applying a cutting force;
    a second eccentric means mountable in said lower jaw aperture for positioning said lower jaw cutting blade in spaced relationship to said upper jaw cutting blade;
    means connectable between said first and second eccentric means for integrating the positions of said upper and lower jaw cutting blades and establishing a cutting force therebetween;
    cutting blade regulating means attachable between said second eccentric means and said lower jaw for fixing the position of said lower jaw cutting blade during cutting of a workpiece and for automatically positioning said cutting blades to maintain grippable contact with a workpiece until the workpiece is severed;
    means attachable to said lower jaw for supporting said lower jaw during use of the shear.

2. A multiple stroke shear for use in cutting a workpiece, comprising:
    an upper and lower jaw hingedly connected together, and having apertures therein, for transmitting a cutting force;
    cutting blades mountable on said upper and lower jaws in opposed operational relationship for cutting a workpiece between said blades;
    said upper and lower jaw apertures being spaced between said jaw hinge and said cutting blades, and adjacent to said cutting blades;
    cylinders rotatable in said upper and lower jaw apertures and having longitudinal passages therethrough offset radially from the longitudinal centerline of said cylinders;
    lever means connectable to said cylinder in said upper jaw aperture for rotating said cylinder for applying a cutting force;
    said cylinder mounted in said lower jaw aperture having a larger diameter than said cylinder mounted in said upper jaw aperture;
    eccentric pins rotatable in said cylinder longitudinal passages and projecting from both ends of said cylinders;
    a pair of links rotatingly attachable between said eccentric pin projections;
    cutting blade regulating means attachable between said cylinder in said lower jaw aperture and said lower jaw for fixing the position of said lower jaw cutting blade during cutting of a workpiece and for automatically positioning said cutting blades to maintain grippable contact with a workpiece until the workpiece is severed; and
    means attachable to said lower jaw for supporting said lower jaw during use of the shear.

3. A multiple stroke shear for use in cutting a workpiece, comprising:
    an upper and lower jaw hingedly connected together, and having apertures therein, for transmitting a cutting force;

cutting blades mountable in said upper and lower jaws in opposed operational relationship for cutting a workpiece between said blades;

said upper and lower jaw apertures being spaced between said jaw hinge and said cutting blades, and adjacent to said cutting blades;

cylinders rotatable in said upper and lower jaw apertures and having longitudinal passages therethrough offset radially from the longitudinal centerline of said cylinders;

lever means connectable to said cylinder mounted in said upper jaw aperture for rotating said cylinder to apply a cutting force;

said cylinder mounted in said lower jaw aperture having a larger diameter than said cylinder mounted in said upper jaw aperture;

eccentric pins rotatable in said cylinder longitudinal passages and projecting from the ends of said cylinders;

a pair of links rotatingly attachable between said eccentric pin projections;

means attachable to said lower jaw cylinder and rotatable therewith, for positioning said lower jaw cutting blade with respect to said upper jaw cutting blade;

spring means connectable between said lower jaw cylinder positioning means and said lower jaw for urging said cutting blades together;

ratchet means attachable to said lower jaw cylinder and rotatable therewith for fixing the position of said lower jaw cylinder and said positioning means during a cutting stroke of said lever means;

a ratchet pawl pivotable on said lower jaw and engageable with said ratchet means; and means attachable to said lower jaw for supporting said lower jaw during use of the shear.

* * * * *